(12) United States Patent
Cimatti et al.

(10) Patent No.: US 8,353,379 B2
(45) Date of Patent: Jan. 15, 2013

(54) OPTIONALLY CONNECTABLE FOUR-WHEEL DRIVE VEHICLE

(75) Inventors: Franco Cimatti, Pavullo (IT); Rudolf Morawetz, S. Caterina-Brunico (IT)

(73) Assignee: Ferrari S.p.A., Modena (IT)

( * ) Notice: Subject to any disclaimer, the term of this patent is extended or adjusted under 35 U.S.C. 154(b) by 355 days.

(21) Appl. No.: 12/450,641

(22) PCT Filed: Apr. 3, 2008

(86) PCT No.: PCT/IB2008/000804
§ 371 (c)(1),
(2), (4) Date: Apr. 26, 2010

(87) PCT Pub. No.: WO2008/120097
PCT Pub. Date: Oct. 9, 2008

(65) Prior Publication Data
US 2010/0206654 A1    Aug. 19, 2010

(30) Foreign Application Priority Data
Apr. 3, 2007    (IT) .............................. BO2007A0244

(51) Int. Cl.
B60K 17/348    (2006.01)
(52) U.S. Cl. ........................................ 180/247; 180/245
(58) Field of Classification Search .................. 180/245, 180/247
See application file for complete search history.

(56) References Cited

U.S. PATENT DOCUMENTS

| | | | | |
|---|---|---|---|---|
| 5,417,298 A * | 5/1995 | Shibahata | ........................ | 180/76 |
| 5,497,845 A * | 3/1996 | Shibahata | ........................ | 180/76 |
| 7,614,470 B2 * | 11/2009 | Peterson et al. | ............... | 180/197 |
| 7,661,495 B2 * | 2/2010 | Zohrer et al. | ............... | 180/65.22 |
| 8,047,322 B2 * | 11/2011 | Cimatti | ........................ | 180/245 |
| 2007/0095593 A1 * | 5/2007 | Peterson et al. | ............... | 180/248 |
| 2007/0144808 A1 * | 6/2007 | Baasch et al. | ................. | 180/247 |

FOREIGN PATENT DOCUMENTS

| | | |
|---|---|---|
| DE | 4039392 | 6/1991 |
| GB | 2230498 | 10/1990 |
| WO | WO 2005/080117 | 9/2005 |
| WO | WO 2006/100585 | 9/2006 |

OTHER PUBLICATIONS

International Search Report and Written Opinion mailed Sep. 4, 2008 in PCT/IB2008/000804.

\* cited by examiner

*Primary Examiner* — Kevin Hurley
*Assistant Examiner* — Michael Stabley
(74) *Attorney, Agent, or Firm* — Davidson Berquist Jackson & Gowdey, LLP

(57) ABSTRACT

An optionally connectable four-wheel drive vehicle having: an engine having a drive shaft; two main drive wheels; a main power train permanently connecting the drive shaft to the main drive wheels and, in turn, having a transmission and a main differential; two normally driven secondary drive wheels; an optionally connectable secondary power train for also connecting the drive shaft to the secondary drive wheels, a gear drive with at least two different, alternatively selectable velocity ratios, and at least one secondary clutch, which is connected on one side to the drive shaft upstream from the transmission and on the other side to the secondary drive wheels.

15 Claims, 5 Drawing Sheets

OPTIONALLY CONNECTABLE FOUR-WHEEL DRIVE VEHICLE

TECHNICAL FIELD

The present invention relates to an optionally connectable four-wheel drive vehicle.

The present invention may be used to advantage in a high-performance sports car, to which the following description refers purely by way of example.

BACKGROUND ART

A high-performance sports car normally has a rear-wheel drive, and a self-locking differential to maximize torque transmission by the rear wheels to the road surface in any driving condition.

A rear-wheel drive with a self-locking differential has advantages when driving in racing mode in good (dry-road) or fairly good (wet-road) grip conditions, but, in conjunction with high torque and wide tyres, makes for extremely difficult, potentially hazardous driving in poor grip conditions (flooded or icy roads). To improve handling of sports cars in poor grip conditions, a permanent or optionally connectable four-wheel drive has been proposed.

A permanent four-wheel drive greatly improves vehicle performance in poor grip conditions, but has the drawback of permanently increasing torque loss of the drive system and so resulting in good-grip vehicle performance which is not always popular with drivers.

An optionally connectable four-wheel drive, on the other hand, enables the driver to switch between a rear-wheel drive in good grip conditions, and a four-wheel drive in poor grip conditions.

Patent Application WO2005080117A2 describes an optionally connectable four-wheel drive vehicle comprising an engine with a drive shaft; two main drive wheels connected permanently to the drive shaft via a transmission with a first clutch; and two secondary drive wheels selectively connectable to the drive shaft by an optionally connectable drive system having a second clutch which is connected on one side with a fixed velocity ratio to the drive shaft upstream from the transmission, and is connected on the other side with a fixed velocity ratio to the secondary drive wheels.

Patent Application WO2006100585A1 describes a refinement of the optionally connectable four-wheel drive vehicle in Patent Application WO2005080117A2. More specifically, the percentage value of the torque to be transmitted to the secondary drive wheels by the second clutch is determined instant by instant as a function of dynamic vehicle parameters detected by respective sensors.

In the solutions proposed in Patent Applications WO2005080117A2 and WO2006100585A1, for the second clutch to transfer torque to the front differential (i.e. to the secondary front drive wheels), the front differential, i.e. the output of the second clutch, must be slower than or at the same speed as the input of the second clutch. In fact, if the second clutch were to be engaged when its output is faster than its input, the second clutch would transfer torque from the front differential to the transmission, i.e. to the rear drive wheels, thus braking the front wheels and overtorquing the rear drive wheels.

The second clutch has unavoidable design limitations, by being unable to ensure an adequate working life if it has to operate with too great a difference in speed between its input and output. As a result, in the solutions proposed in Patent Applications WO2005080117A2 and WO2006100585A1, the velocity ratios of the system must be such that:

when the third gear is engaged, the secondary shaft of the transmission (governing rotation of the rear wheels), the output of the second clutch (governing rotation of the front wheels), and the input of the second clutch have the same angular speed, so the second clutch can be fully engaged (i.e. with no slip) to transfer torque to the front wheels;

when the first or second gear is engaged, the secondary shaft of the transmission and the output of the second clutch are slower than the input of the second clutch, so the second clutch can be engaged partly (i.e. with a certain amount of slip to match speed) to transfer torque to the front wheels;

when a higher-than-third gear is engaged, the secondary shaft of the transmission and the output of the second clutch are faster than the input of the second clutch, which therefore cannot be engaged to transfer torque to the front wheels.

As a result, in the solutions proposed in Patent Applications WO2005080117A2 and WO2006100585A1, the four-wheel drive can only be engaged in low gears (typically, first, second, and third), and not at all in the other gears.

DISCLOSURE OF THE INVENTION

It is an object of the present invention to provide an optionally connectable four-wheel drive vehicle that is cheap and easy to produce, eliminates the aforementioned drawbacks, and at the same time provides for improving performance, stability, and drive in all grip conditions.

According to the present invention, there is provided an optionally connectable four-wheel drive vehicle, as claimed in the accompanying Claims.

BRIEF DESCRIPTION OF THE DRAWINGS

A number of non-limiting embodiments of the present invention will be described by way of example with reference to the accompanying drawings, in which.

PREFERRED EMBODIMENTS OF THE INVENTION

Figure 1:
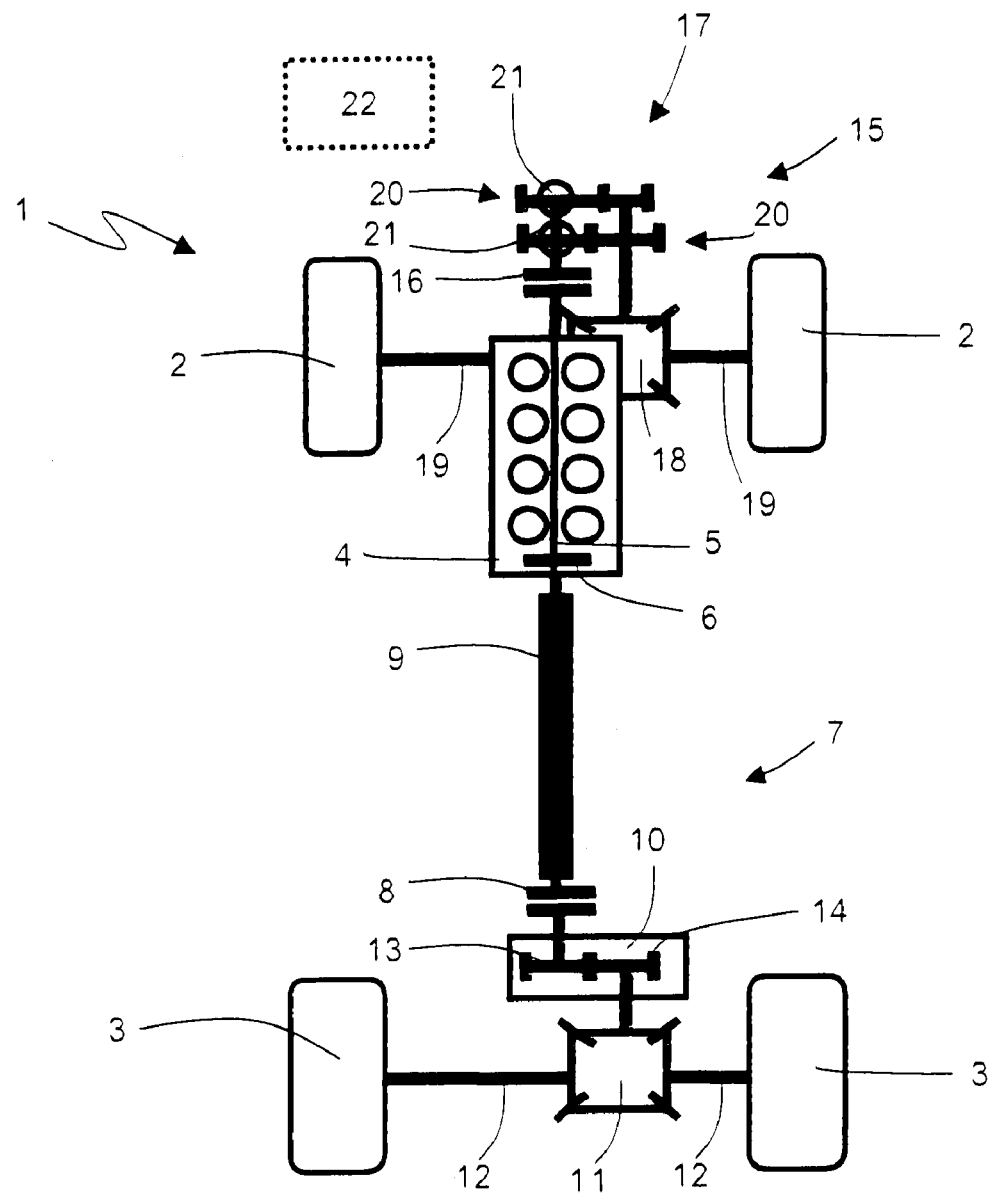
FIG. 1 shows a schematic plan view of an optionally connectable four-wheel drive car in accordance with the present invention.

Number 1 in FIG. 1 indicates a car having two normally driven front wheels (or secondary drive wheels) 2; and two rear, permanent drive wheels (or main drive wheels) 3. Car 1 comprises a front longitudinal internal combustion engine 4, which has a drive shaft 5 fitted with a flywheel 6, and is connected to rear drive wheels 3 by a main power train 7. Main power train 7 comprises a main clutch 8 located at the rear and connected on one side to drive shaft 5 by a propeller shaft 9, and on the other side to a rear transmission 10. A rear (or main) differential 11 is cascade-connected to transmission 10, and from which extend two rear axle shafts 12, each integral with a rear wheel 3. A primary shaft 13 of transmission 10 is integral with the output of main clutch 8, and a secondary shaft 14 of transmission 10 is connected to rear differential 11.

Car 1 comprises an optionally connectable secondary power train 15 for also connecting front wheels 2 to drive shaft 5 and so also obtaining front drive wheels 2. Secondary power train 15 comprises a secondary clutch 16 connected on one side to drive shaft 5 upstream from transmission 10, and on the other side to front wheels 2 by a gear drive 17 and a front (or secondary) differential 18, from which extend two front axle shafts 19 integral with front wheels 2.

Gear drive 17 has two alternatively selectable velocity ratios. More specifically, gear drive 17 comprises two gear pairs 20, each with a respective velocity ratio, and each employable alternatively to the other gear pair 20.

In the FIG. 1 embodiment, each gear pair 20 comprises a shift device 21 (normally a synchronizer) for engaging/disengaging torque transmission by the respective gear pair 20. In this case, when secondary clutch 16 is released, a control unit 22 controls shift devices 21 to engage torque transmission by the desired gear pair 20, and disengage torque transmission by the other gear pair 20. Both gear pairs 20 may obviously be disengaged, but never engaged, at the same time.

In other words, in the FIG. 1 embodiment, optionally connectable secondary power train 15 comprises one secondary clutch 16 between drive shaft 5 and gear drive 17.

Mechanical transmission 10 comprises a number of gears, e.g. six forward gears (I to VI) and a reverse gear. Each velocity ratio of gear drive 17 is such that, when a respective synchronizing gear is engaged in transmission 10, the input and output of secondary clutch 16 are at the same speed. For example, the synchronizing gear of a first velocity ratio of gear drive 17 is the third (III), and the synchronizing gear of a second velocity ratio of gear drive 17 is the sixth (VI).

In a preferred embodiment, each velocity ratio of gear drive 17 corresponds exactly to the velocity ratio determined by the respective synchronizing gear of transmission 10, and the velocity ratio of front differential 18 is identical to that of rear differential 11. Consequently, if a given gear pair 20 is engaged:

when the corresponding synchronizing gear is engaged in transmission 10, secondary shaft 14 of transmission 10 (governing rotation of rear wheels 3), the output of secondary clutch 16 (governing rotation of front wheels 2), and the input of secondary clutch 16 have the same angular speed;

when a lower gear than the corresponding synchronizing gear is engaged in transmission 10, secondary shaft 14 of transmission 10 and the output of secondary clutch 16 rotate slower than the input of secondary clutch 16; and when a higher gear than the corresponding synchronizing gear is engaged in transmission 10, secondary shaft 14 of transmission 10 and the output of secondary clutch 16 rotate faster than the input of secondary clutch 16.

For secondary clutch 16 to transfer torque to front differential 18 (i.e. to front wheels 2), the output of secondary clutch 16 must be slower than or at the same speed as the input of secondary clutch 16. If secondary clutch 16 were to be engaged when its output is faster than its input, secondary clutch 16 would transfer torque from front differential 18 to transmission 10, i.e. to rear drive wheels 3, thus braking front wheels 2 and overtorquing rear drive wheels 3.

In a different embodiment, each velocity ratio of gear drive 17 differs from the velocity ratio determined by the synchronizing gear, and the velocity ratio of front differential 18 differs from that of rear differential 11, so that, when the corresponding synchronizing gear is engaged in transmission 10; the output and input of secondary clutch 16 have the same angular speed.

In control unit 22, each velocity ratio of gear drive 17 is associated with a group of gears of transmission 10, and is only used to transfer torque from drive shaft 5 to front wheels 2 if one of the gears in the respective group is engaged in transmission 10. In other words, each velocity ratio of gear drive 17 has a given synchronizing gear, and is therefore associated with a group of gears in transmission 10 comprising the respective synchronizing gear, and gears lower than the synchronizing gear. For example, if the synchronizing gear of a first velocity ratio of gear drive 17 is the third (III), and the synchronizing gear of a second velocity ratio of gear drive 17 is the sixth (VI), then the first velocity ratio of gear drive 17 is associated with a group of gears of transmission 10 comprising the first (I), second (II), and third (III), and the second velocity ratio of gear drive 17 is associated with a group of gears of transmission 10 comprising the fourth (IV), fifth (V), and sixth (VI).

It is important to note that each gear of transmission 10 may only form part of one group of gears, and may therefore only be associated with one velocity ratio of gear drive 17.

Control of secondary clutch 16 is described in detail in Patent Application WO2006100585A1, which is included herein by way of reference. The only difference lies in control unit 22 being able to count of two different velocity ratios of gear drive 17 (selectable alternatively prior to engaging secondary clutch 16) to transmit torque permanently or almost permanently to front wheels 2.

Figure 2:
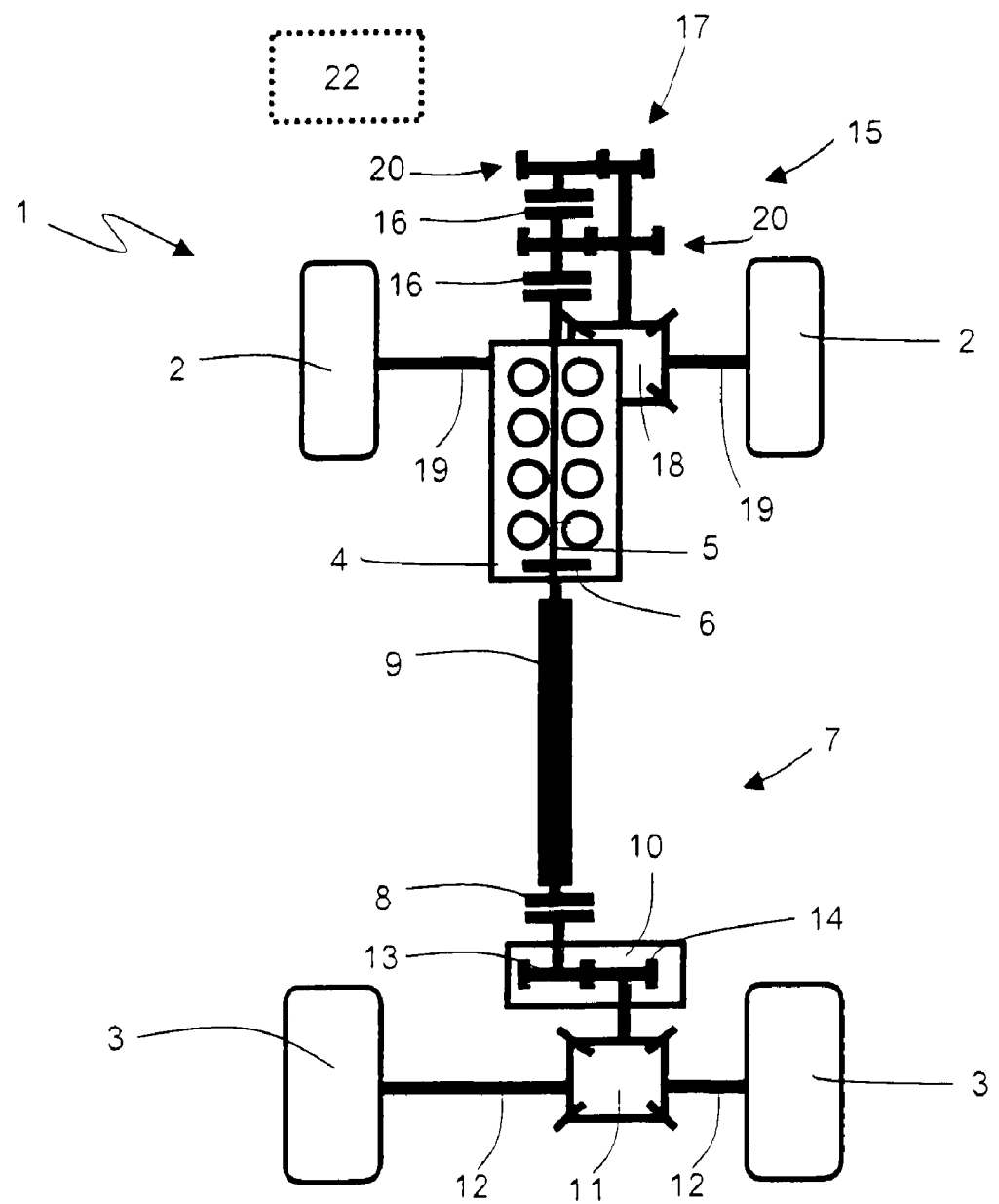
FIG. 2 shows a schematic view of a variation of the FIG. 1 car.
Figure 3:
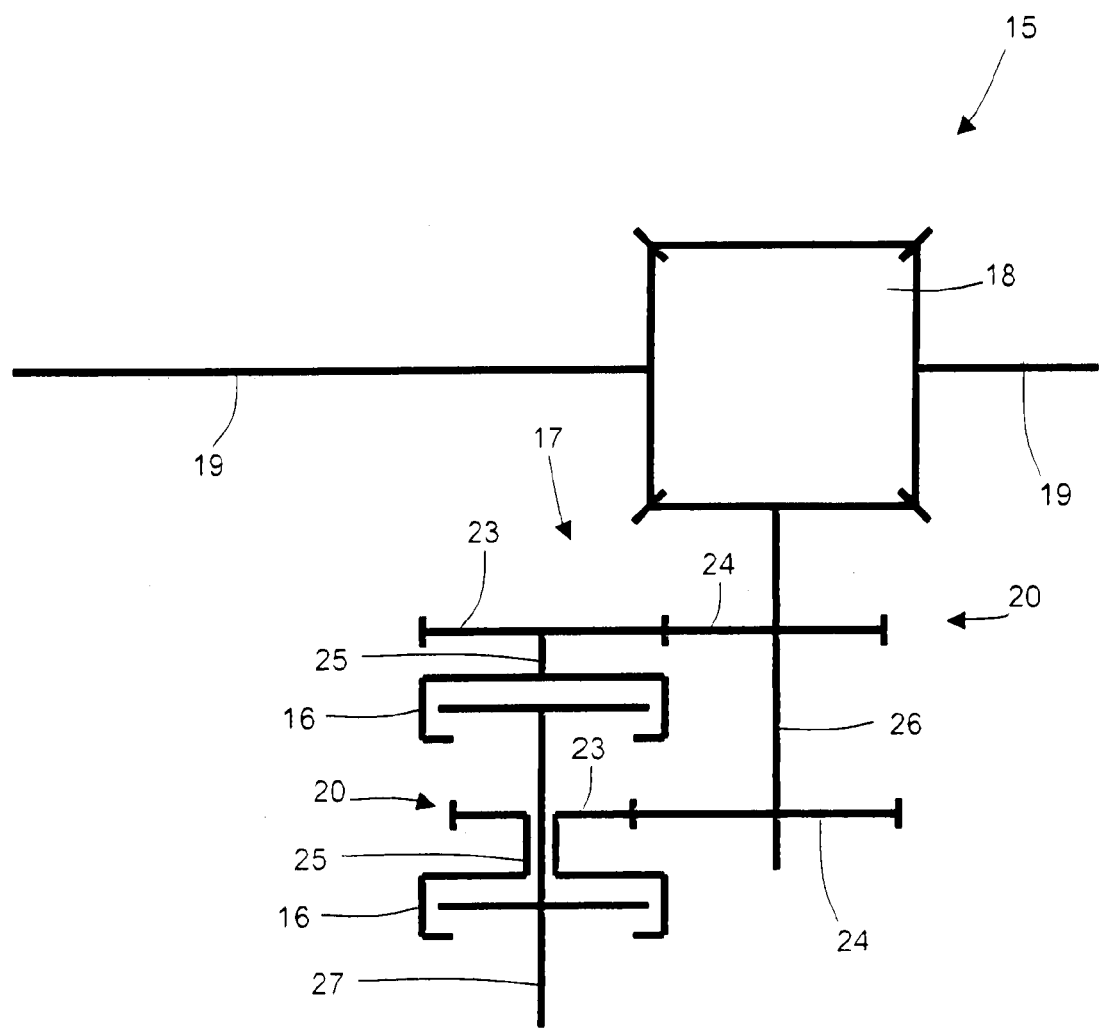
FIG. 3 shows a schematic view of an optionally connectable power train of the FIG. 2 car.

In the FIGS. 2 and 3 embodiment, optionally connectable secondary power train 15 comprises two secondary clutches 16, each associated with and for connecting a respective gear pair 20 to drive shaft 5. In this case, gear drive 17 has no shift devices 21, the function of which is performed directly by the two secondary clutches 16.

As shown in FIG. 3, each gear pair 20 comprises an input gear 23 connected to drive shaft 5 by respective secondary clutch 16; and an output gear 24 meshing with input gear 23 and connected permanently to secondary drive wheels 2. The two input gears 23 of gear pairs 20 are coaxial, and are fitted to respective separate, coaxial shafts 25; the two output gears 24 of gear pairs 20 are coaxial, and are fitted to a common shaft 26 integral with an input of front differential 18; and the inputs of the two secondary clutches 16 are fitted to a common shaft 27 integral with drive shaft 5.

In the FIGS. 1-3 embodiment, drive shaft 5 transmits power to front wheels 2 on one side, and to rear wheels 3 on the opposite side. In other words, drive shaft 5 has two power take-offs on opposite sides of engine 4. Alternatively, drive shaft 5 may have one power take-off for all four wheels 2 and 3, as described in Patent Application WO2006100585A1, which is included herein by way of reference.

The optionally connectable four-wheel drive described above has numerous advantages, by being cheap and easy to produce, and above all by being engageable (i.e. permitting torque transfer to front wheels 2) in substantially all the gears of transmission 10.

Figure 4:
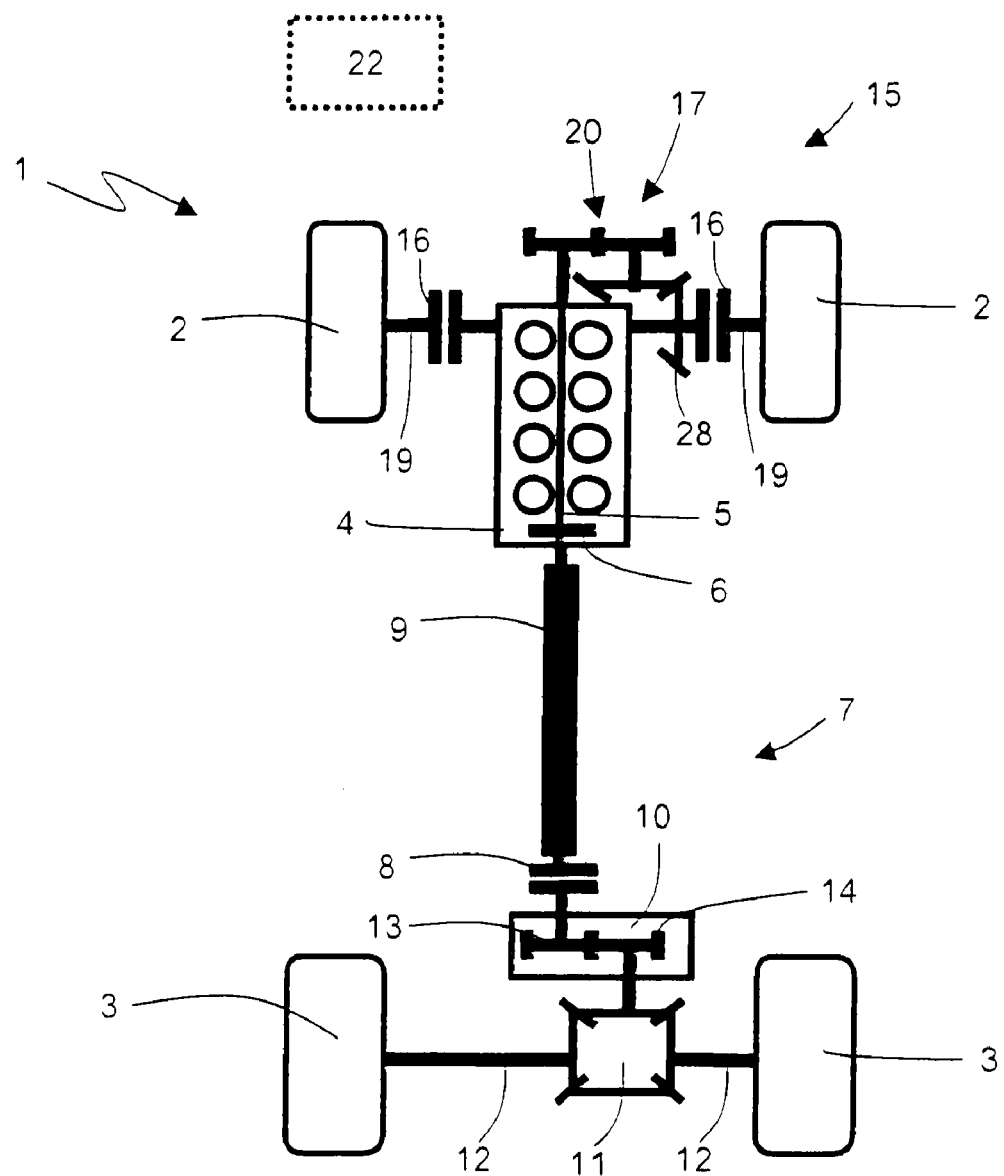
FIGS. 4 and 5 show a further optionally connectable four-wheel drive cars in accordance with the present invention.

FIG. 4 shows a different design of car 1, in which gear drive 17 has one constant velocity ratio; and optionally connectable secondary power train 15 has no front differential 18, and comprises two secondary clutches 16, each connected directly to a respective front wheel 2. In other words, each secondary clutch 16 is coaxial with respective front wheel 2, and is connected at the output to an axle shaft 19 of respective front wheel 2. Optionally connectable secondary power train 15 comprises a bevel gear pair 28 for transmitting power from drive shaft 5 to secondary clutches 16, and, as stated, has no front differential 18, the function of which is performed by secondary clutches 16. In other words, any difference in the rotation speed of the two front wheels 2 is compensated by a corresponding difference in slip of the two secondary clutches 16.

As stated, mechanical transmission 10 comprises a number of gears, e.g. six forward gears (I to VI) and a reverse gear. Each velocity ratio of gear drive 17 is such that, when a respective synchronizing gear is engaged in transmission 10, the input and output of secondary clutch 16 are at the same speed.

The optionally connectable four-wheel drive in FIG. 4 has the advantage of controlling the two secondary clutches 16 differently, and so applying different torques to the two front wheels 2, i.e. enabling "torque vectoring", by which nonsymmetrical torque is applied (obviously, only in certain conditions) to enhance traction and stability of car 1. For example, when cornering, greater torque is applied to, and so transmitted to the road by, the inside front wheel 2 than the outside front wheel 2, Moreover, using two secondary clutches 16, torque transfer to front wheels 2 can be divided between two separate secondary clutches 16, thus reducing heating and wear of secondary clutches 16, for a given torque transfer, as compared with a single secondary clutch 16 arrangement.

Figure 5:
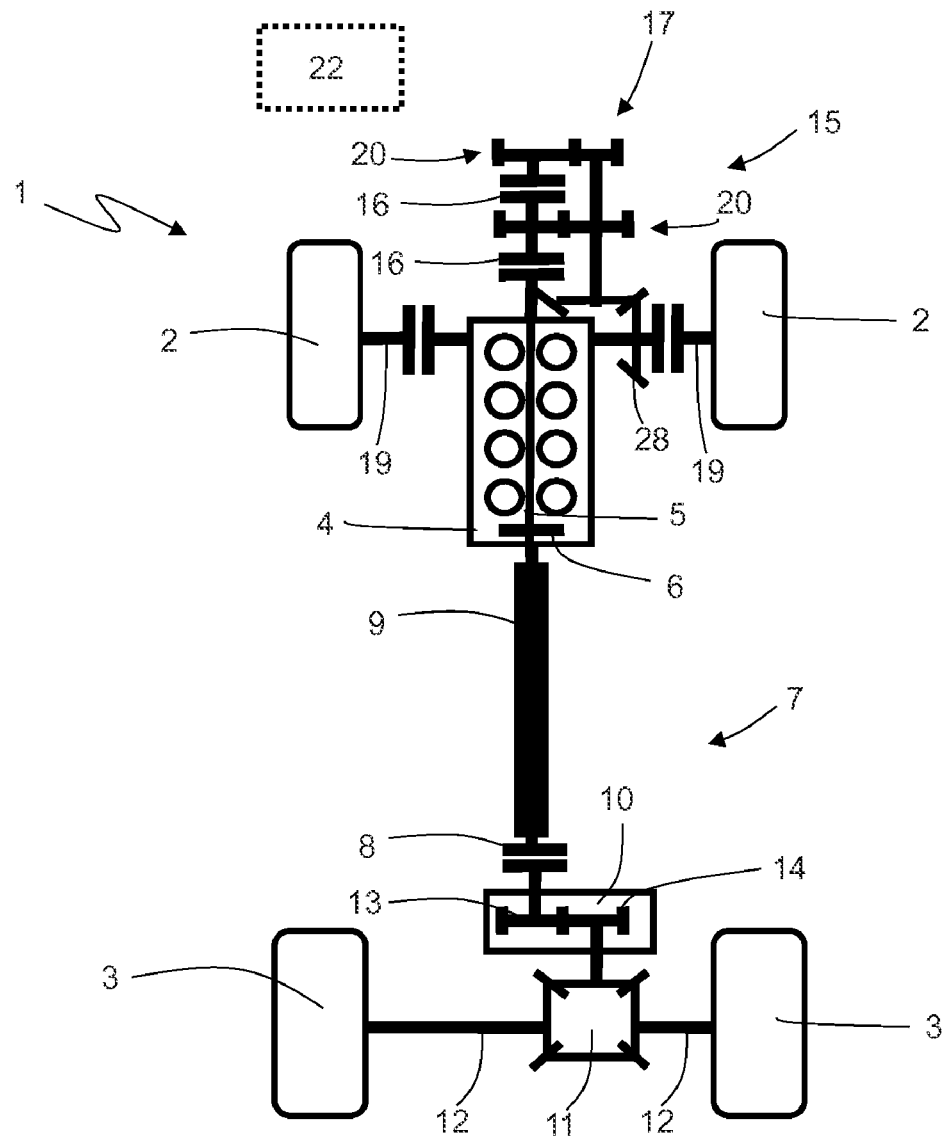

A further embodiment, shown in FIG. 5, may combine the optionally connectable four-wheel drives in FIGS. 1 and 4. In which case, two secondary clutches 16 are provided, each connected directly to a respective front wheel 1; and gear drive 17 has two different, alternatively selectable velocity rations. More specifically, gear drive 17 comprises two gear pairs 20, each with a respective velocity ration, and each employable alternatively to the other gear pair 20 by controlling a respective shift drive devise 21.

The invention claimed is:

1. An optionally connectable four-wheel drive vehicle comprising :
   an engine having a drive shaft;
   two main drive wheels;
   a main power train permanently connecting the drive shaft of an engine to the main drive wheels, and in turn comprising a transmission and a main differential;
   two normally driven secondary drive wheels; and
   an optionally connectable secondary power train for also connecting the drive shaft of the engine to the secondary drive wheels, and in turn comprising a gear drive, and at least one secondary clutch, which is connected on one side to the drive shaft of the engine at a point located upstream from the transmission of the main power train, and on the other side to the secondary drive wheels;
   wherein the gear drive of the optionally connectable secondary power train has two different, alternatively selectable velocity ratios;
   the gear drive of the optionally connectable secondary power train comprises two gear pairs, each having a respective velocity ratio; and two secondary clutches, each associated with a respective gear pair and for connecting the gear pair to the drive shaft of the engine upstream from the transmission of the main power train; and
   each gear pair comprises an input gear connected to the drive shaft of the engine upstream from the transmission of the main power train by the respective secondary clutch; and an output gear which meshes with the input gear and is connected permanently to the secondary drive wheels.

2. A vehicle as claimed in claim 1, wherein the two input gears of the two gear pairs are coaxial, and the two output gears of the two gear pairs are coaxial.

3. A vehicle as claimed in claim 2, wherein the two input gears of the two gear pairs are fitted to respective separate, coaxial shafts; and the two output gears of the two gear pairs are fitted to a common shaft.

4. A vehicle as claimed in claim 3, wherein the inputs of the two secondary clutches are fitted to a common shaft integral with the drive shaft.

5. A vehicle as claimed in claim 1, wherein the transmission comprises a number of gears; and each velocity ratio of the gear drive is such that, when a respective synchronizing gear is engaged in the transmission, the input and output of the secondary clutch are at the same speed.

6. A vehicle as claimed in claim 1, wherein the transmission comprises a number of gears; each velocity ratio of the gear drive is associated with a group of gears of the transmission, and is only used to transfer torque from the drive shaft to the secondary drive wheels if one of the gears in the respective group of gears is engaged in the transmission.

7. A vehicle as claimed in claim 6, wherein each gear of the transmission may only form part of one group of gears, and may therefore only be associated with one velocity ratio of the gear drive.

8. A vehicle as claimed in claim 1, wherein the transmission is mechanical, and the main power train comprises at least one main clutch.

9. A vehicle as claimed in claim 1, wherein the optionally connectable secondary power train comprises a front differential.

10. A vehicle as claimed in claim 1, wherein the optionally connectable secondary power train comprises two further secondary clutches, each connected directly to a respective secondary drive wheel.

11. A vehicle as claimed in claim 10, wherein each further secondary clutch has an output fitted to an axle shaft of the respective secondary drive wheel.

12. A vehicle as claimed in claim 10, wherein the optionally connectable secondary power train comprises a bevel gear pair for transmitting power from the drive shaft to the further secondary clutches, and has no front differential.

13. An optionally connectable four-wheel drive vehicle comprising :
   an engine having a drive shaft;
   two main drive wheels;
   a main power train permanently connecting the drive shaft to the main drive wheels, and in turn comprising a transmission and a main differential;
   two normally driven secondary drive wheels; and
   an optionally connectable secondary power train for also connecting the drive shaft to the secondary drive wheels, and in turn comprising a gear drive, and at least one secondary clutch, which is connected on one side to the drive shaft upstream from the transmission, and on the other side to the secondary drive wheels;
   wherein the gear drive of the optionally connectable secondary power train has two different, alternatively selectable velocity ratios;
   the gear drive of the optionally connectable secondary power train comprises two gear pairs, each having a respective velocity ratio; and two secondary clutches, each associated with a respective gear pair and for connecting the gear pair to the drive shaft; and
   each gear pair comprises an input gear connected to the drive shaft by the respective secondary clutch; and an output gear which meshes with the input gear and is connected permanently to the secondary drive wheels;
   wherein the optionally connectable secondary power train comprises two further secondary clutches, each connected directly to a respective secondary drive wheel.

14. A vehicle as claimed in claim 13, wherein each further secondary clutch has an output fitted to an axle shaft of the respective secondary drive wheel.

15. A vehicle as claimed in claim 13, wherein the optionally connectable secondary power train comprises a bevel gear pair for transmitting power from the drive shaft to the further secondary clutches, and has no front differential.

* * * * *